US006947825B2

(12) United States Patent
Nakano et al.

(10) Patent No.: US 6,947,825 B2
(45) Date of Patent: Sep. 20, 2005

(54) FUEL INJECTION QUANTITY CONTROL DEVICE FOR DIESEL ENGINE

(75) Inventors: Futoshi Nakano, Fujisawa (JP); Akira Hirata, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/734,875

(22) Filed: Dec. 12, 2003

(65) Prior Publication Data

US 2004/0128056 A1 Jul. 1, 2004

(30) Foreign Application Priority Data

Dec. 18, 2002 (JP) ........................................ 2002-366213

(51) Int. Cl.[7] ................................................ B60T 7/12

(52) U.S. Cl. ....................... 701/105; 701/104; 701/112; 701/110

(58) Field of Search ................................ 701/105, 104, 701/112, 110

(56) References Cited

U.S. PATENT DOCUMENTS

| | | | | |
|---|---|---|---|---|
| 4,150,651 A | | 4/1979 | Wade et al. | 123/140 |
| 4,639,871 A | | 1/1987 | Sakai et al. | 364/431.1 |
| 6,092,504 A | | 7/2000 | Barnes et al. | 123/357 |
| 6,526,347 B2 | * | 2/2003 | Kim | 701/104 |
| 6,763,903 B2 | * | 7/2004 | Morimoto et al. | 180/65.2 |

FOREIGN PATENT DOCUMENTS

| | | |
|---|---|---|
| JP | 06-294327 | 10/1994 |
| JP | 2002-155765 | 5/2002 |

OTHER PUBLICATIONS

Copy of European Search Report for Serial No. EP 03 02 8760 dated Mar. 31, 2005.

* cited by examiner

*Primary Examiner*—Tony M. Argenbright
*Assistant Examiner*—Johnny H. Hoang
(74) *Attorney, Agent, or Firm*—McCormick, Paulding & Huber LLP

(57) ABSTRACT

The present invention provides a fuel injection quantity control device for a diesel engine, having injection quantity determination unit for determining the required fuel injection quantity based on the accelerator opening degree and engine revolution speed. The device comprising control unit for conducting a minimum cut-off control. With the present invention, the generation of white smoke during injection restart following the fuel injection cut-off can be prevented merely by controlling the injection quantity, without using a separate device.

12 Claims, 5 Drawing Sheets

FUEL INJECTION QUANTITY CONTROL DEVICE FOR DIESEL ENGINE

CROSS REFERENCE TO RELATED APPLICATION

Applicants hereby claim foreign priority benefits under U.S.C. §119 of Japanese Patent Application No. 2002-366213, filed on Dec. 18, 2002, and the content of which is herein incorporated by reference.

BACKGROUND OF THE INVENTION

1. Field of the Invention

The present invention relates to a fuel injection quantity control device with specific operation when fuel injection in a diesel engine is restarted from a cut-off state.

2. Description of the Related Art

It is considered that the case in which an accelerator pedal is pressed and fuel injection is restarted from a state in which fuel injection in a diesel engine has been cut off for the prescribed time, for example, a state in which the accelerator pedal was released on a slope and engine brake was actuated. In this case fuel is injected into cylinders that were cooled because fuel injection was cut off for the prescribed time during which the vehicle was on the slope. As a result, if the fuel injection quantity is small, the entire injected fuel is not combusted properly and the non-combusted components are discharged as white smoke.

The following countermeasures are known for preventing the white smoke, causing a glow plug provided in a cylinder head to generate heat during the fuel injection cut-off and maintaining the temperature inside the cylinder at a temperature prior to the fuel cut-off; providing an intake throttle valve in an intake pipe and suppressing temperature decrease inside the cylinders by throttling the air intake, which causes cooling inside the cylinders, with this throttle valve when fuel injection is cut off; and providing an exhaust throttle valve in an exhaust pipe and throttling the exhaust gas with the throttle valve during the fuel injection cut off to retain part of the exhaust gas inside the cylinder and suppress the temperature decrease (for example, Japanese Patent Applications Laid-open publication No. 2002-155765).

However, with the above-described countermeasures, the appropriate combustion during subsequent small fuel injection is guaranteed and white smoke generation is prevented by maintaining the temperature inside the cylinders during fuel injection cut-off at a level prior to the fuel injection cut-off with a variety of devices (glow plug, intake throttle valve, exhaust throttle valve). Therefore a device (glow plug, intake throttle valve, exhaust throttle valve) for maintaining the temperature inside the cylinders is required and cost is increased.

Furthermore, when a glow plug system is used even if the glow plug is actuated in an intake air flow, the temperature inside the cylinders actually cannot be maintained at a level prior to the fuel cut-off (temperature at which white smoke can be prevented).

SUMMARY OF THE INVENTION

The present invention was conceived with the above-described problems in view and it is an advantage thereof to provide a fuel injection quantity control device for a diesel engine, which can prevent the generation of white smoke during injection restart following the fuel injection cut-off by employing only the injection quantity control, without using any separate device.

In order to attain the above-mentioned advantage, the present invention provides a fuel injection quantity control device for a diesel engine, having injection quantity determination means for determining the required fuel injection quantity based on the accelerator opening degree and engine revolution speed, the device comprising control means for conducting a minimum cut-off control such that, at the time the injection is to be restarted after fuel injection has been cut-off for the predetermined time, the fuel injection cut-off is continued when the required injection quantity determined by the injection quantity determination means is less than the prescribed minute injection quantity, and the fuel injection is restarted when the required injection quantity is equal to the prescribed injection quantity or larger, this restart being made with the required injection quantity attained at this time.

Further, it is preferred that the device comprises a first timer for measuring the continuation time of the fuel injection cut-off and first prohibiting and permitting means for prohibiting the minimum cut-off control of the control means when the output time of the first timer is less than the prescribed first set time and permitting the minimum cut off control of the control means when the output time of the first timer is equal to the first set time or longer.

Further, it is preferred that the device comprise a second timer for measuring the elapsed time from the fuel injection restart, when permission of the minimum cut-off control by the control means is continued, and second prohibiting and permitting means for continuing permission of the minimum cut-off control by the control means when the output time of the second timer is less than the prescribed second set time and prohibits the minimum cut-off control of the control means when the output time of the second timer is equal to the second set time or longer.

Further, it is preferred that the minute injection quantity be set to a lower limit injection quantity at which no white smoke is discharged from the diesel engine when fuel injection is restarted inside the cylinders.

Further, it is preferred that the first set time be set to a time in which the temperature inside the cylinders is maintained at a temperature at which no white smoke is discharged from the diesel engine even if the fuel is injected in a quantity less than the prescribed injection quantity, this being maintained by the combustion preceding the fuel injection cut-off.

Further, it is preferred that the second set time be set to a time in which the temperature inside the cylinders does not rise to a temperature at which no white smoke is discharged from the diesel engine when the fuel is injected in a quantity less than the prescribed injection quantity, even under the effect of combustion resulting from the restarted fuel injection.

DESCRIPTION OF THE PREFERRED EMBODIMENTS

The preferred embodiment of the present invention will be described below based on the appended drawings.

Figure 1:
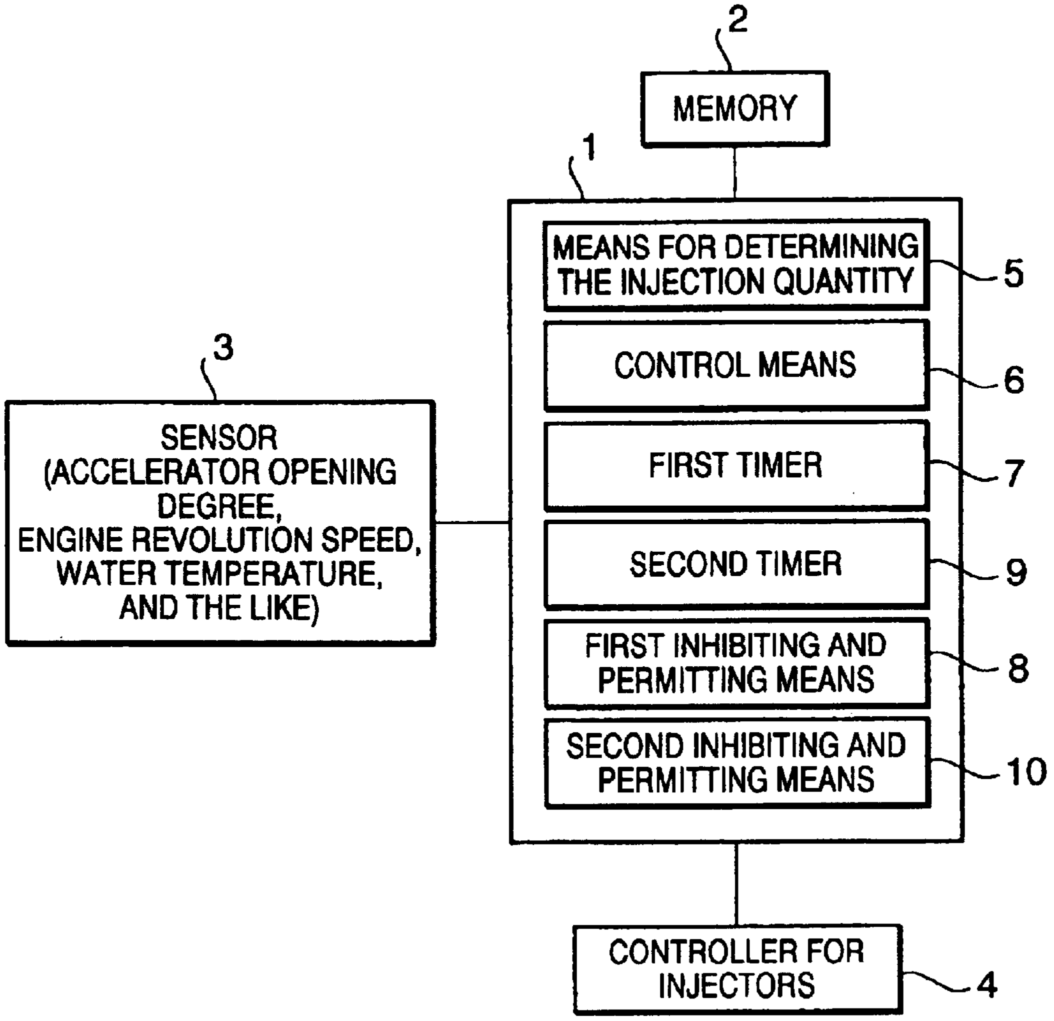
FIG. 1 is a system view of the fuel injection quantity control device for a diesel engine, which is an embodiment of the present invention.
Figure 2:
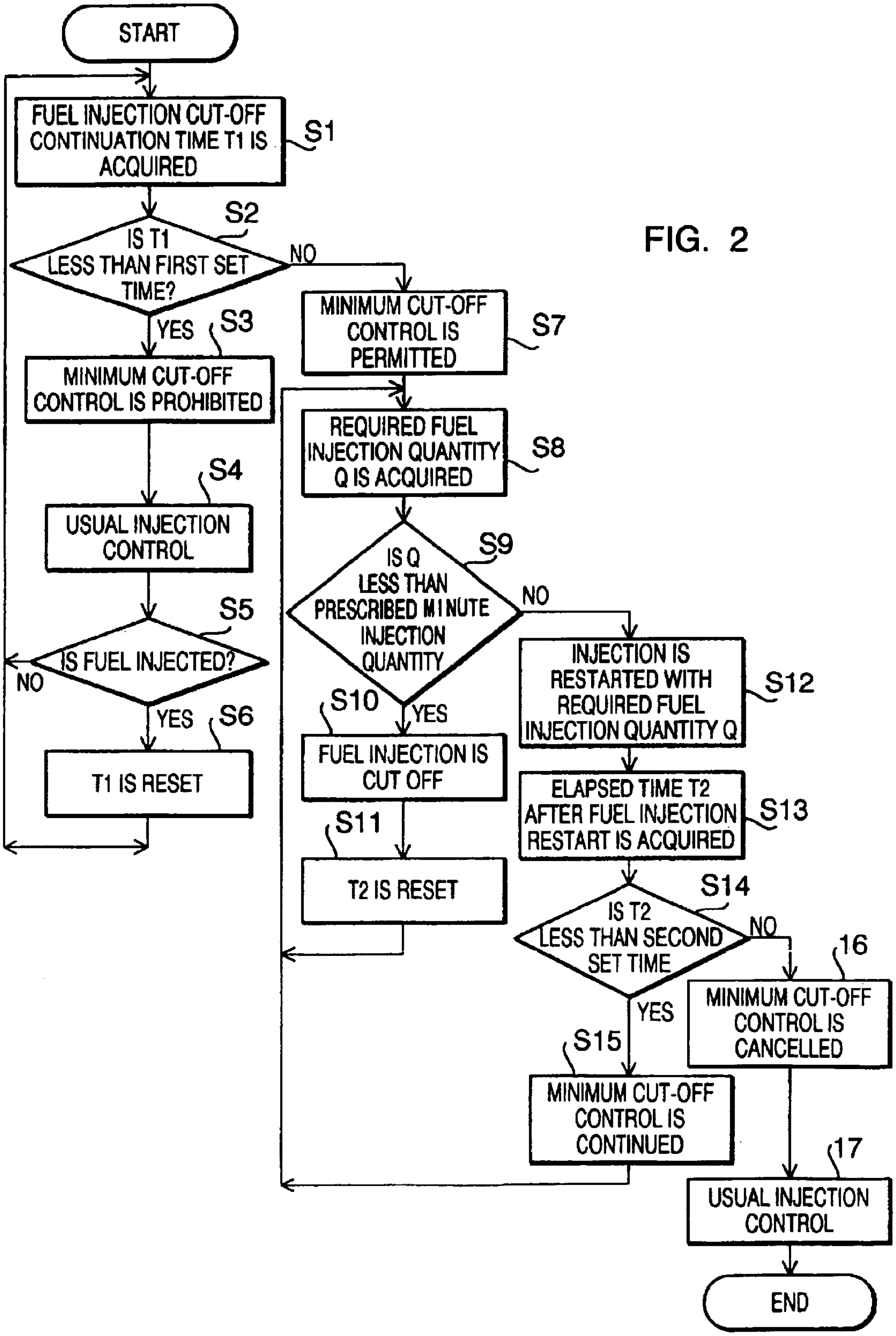
FIG. 2 is a control flow diagram of the fuel injection quantity control unit.
Figure 3:
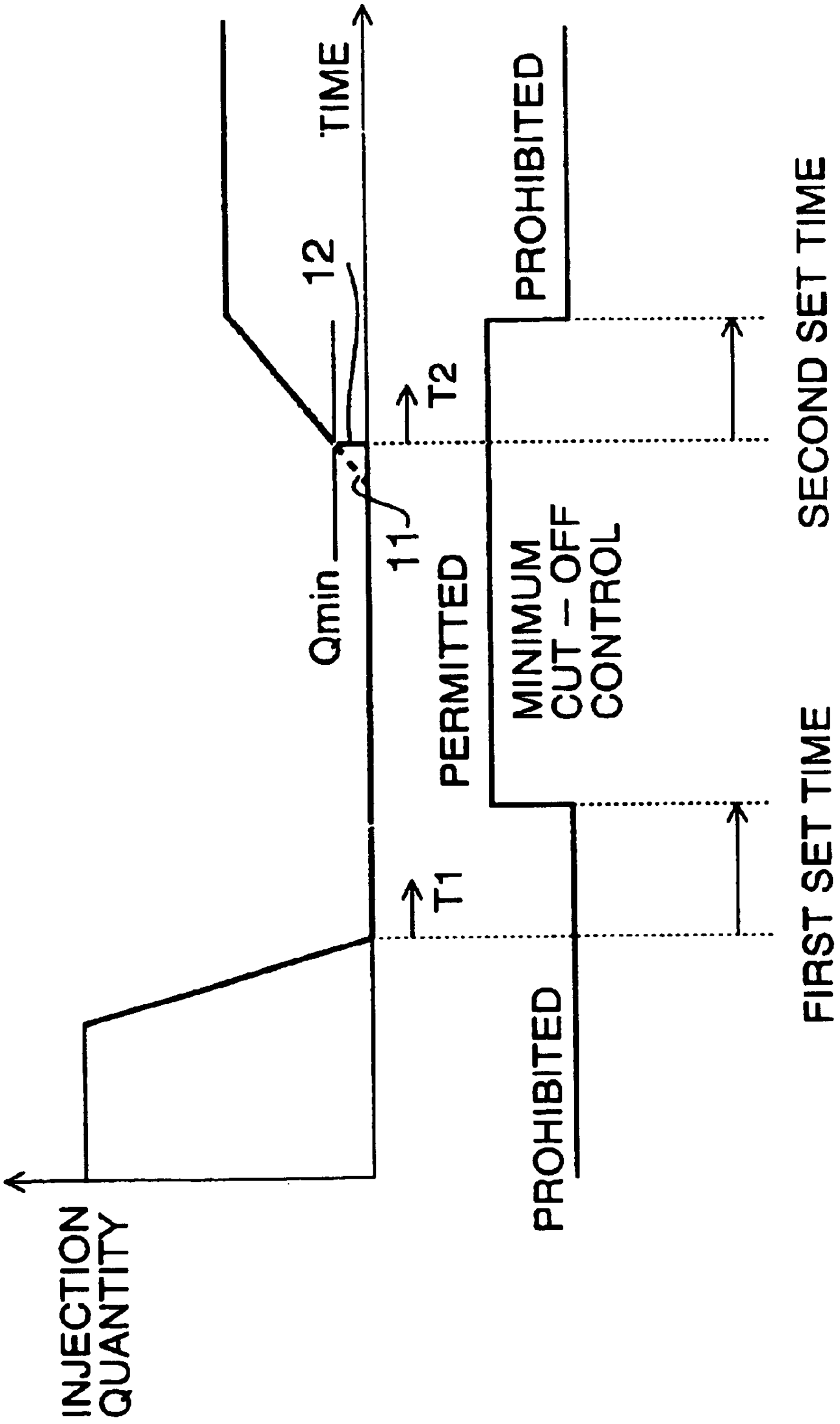
FIG. 3 is an injection chart based on the control flow diagram.
Figure 4:
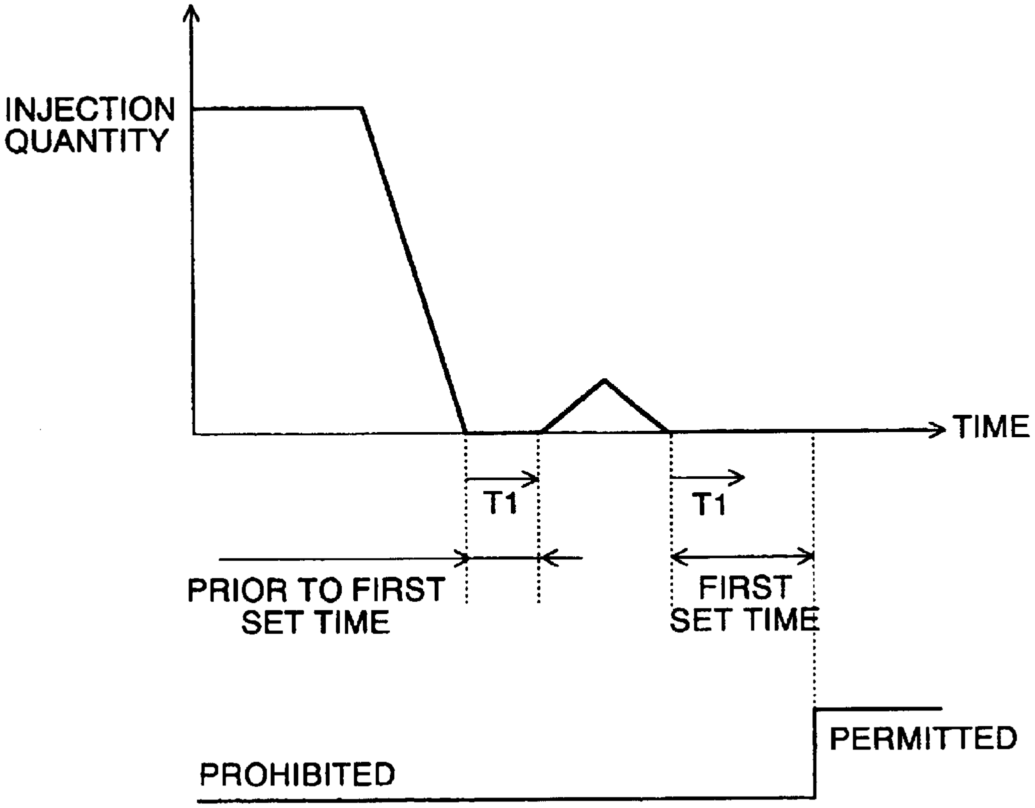
FIG. 4 is partially expanded view of the injection chart diagram.
Figure 5:
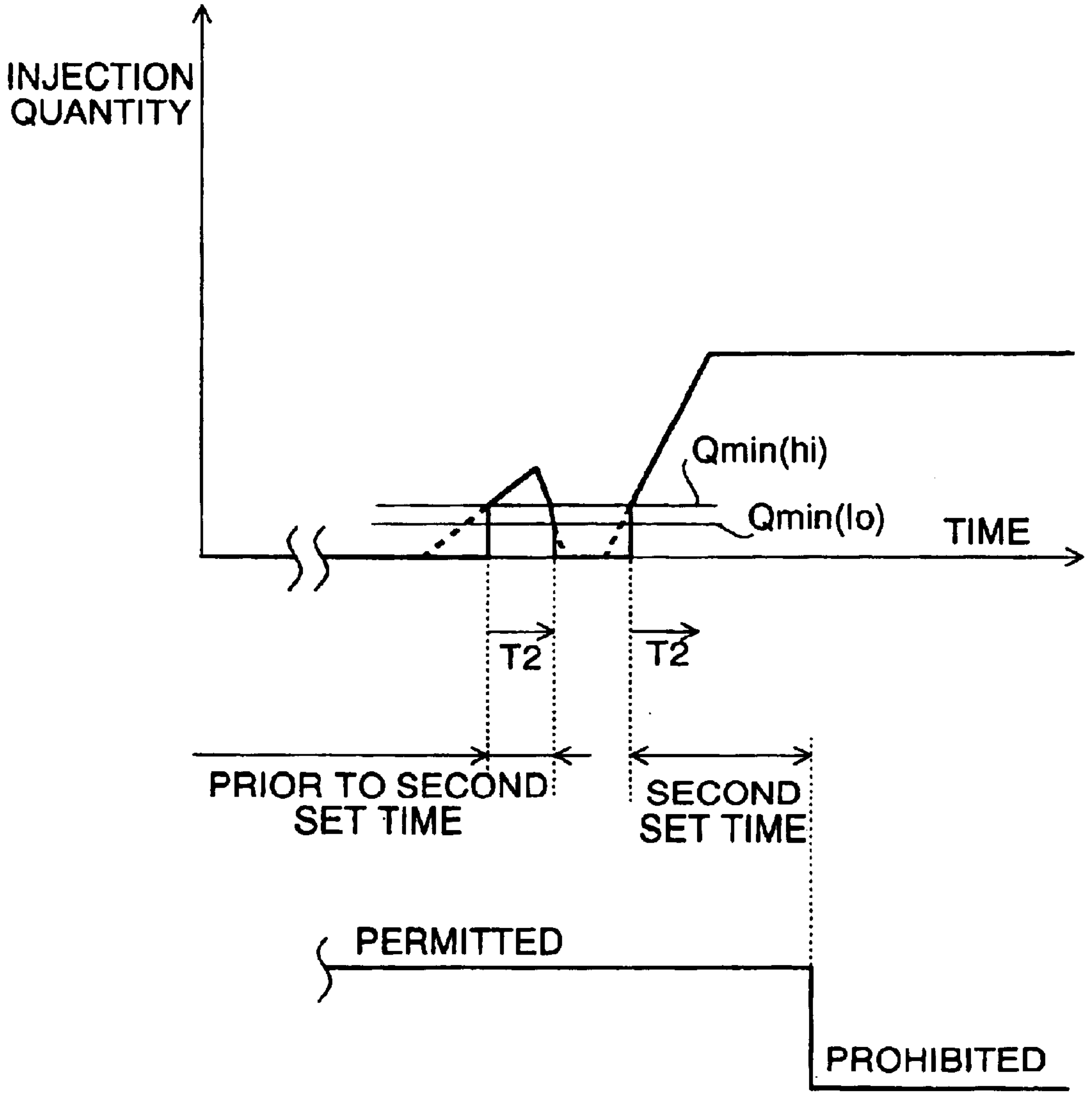
FIG. 5 is partially expanded view of the injection chart diagram.

FIG. 1 is a system view of the fuel injection quantity control device for a diesel engine of the present embodiment. FIG. 2 is a control flow diagram of the fuel injection quantity control unit. FIG. 3 is an injection chart based on the control flow diagram. FIGS. 4 and 5 are partially expanded view of the injection chart diagram.

In the fuel injection quantity control device for a diesel engine of the present embodiment, the conventional problem of white smoke generation occurring when a very small quantity of fuel is injected into a cylinder cooled because fuel injection was cut off for the prescribed time is resolved by controlling the fuel injection quantity.

As shown in FIG. 1, the fuel injection quantity control device comprises operation means (CPU) 1, memory means (memory: ROM) 2, and detection means (various sensors) 3, and controls the period and quantity of fuel injection by controlling a controller 4 of injectors. The CPU 1 comprises injection quantity determination means 5 for determining the required fuel injection quantity Q based on the engine revolution speed (rpm) and accelerator opening degree. The injection quantity determination means inputs the engine revolution speed and accelerator opening degree obtained from the various sensors 3 into the prescribed map which is read from the memory 2 and determines the required fuel injection quantity Q.

The CPU 1 is also provided with control means 6. The control means 6, as shown in steps S8–S12 in FIG. 2, conducts a selective control (minimum cut-off control) by which it issues an instruction to continue the fuel injection cut-off to the injector controller 4 when the required fuel injection quantity Q determined by the injection quantity determination means 5 is less than the prescribed injection quantity Qmin, and issues an instruction to restart fuel injection to the injector controller 4 when the required fuel injection quantity is equal to the prescribed injection quantity Qmin or higher, this restart being conducted at the required fuel injection quantity Q at this time. The above-mentioned minute injection quantity Qmin is set to a lower limit injection quantity at which no white smoke is discharged from the diesel engine by taking into account the driving conditions, when fuel is injected into the cylinders cooled by the fuel injection cut-off.

Furthermore, the CPU 1 also comprises a first timer 7 for measuring the continuation time of the fuel injection cut-off. The first timer 7 measures the injection cut-off continuation time T1 by measuring the injection cut-off signal supplied to the injector controller 4.

The CPU 1 also comprises first inhibiting and permitting means 8. The first inhibiting and permitting means 8, as shown by steps S1–S7 in FIG. 2, inhibits the minimum cut-off control by the control means 6 when the output time T1 of the first timer 7 is less than the prescribed first set time, and permits the minimum cut-off control when the output time is equal to the first set time or longer. The first set time is set to a time in which the temperature inside the cylinders is maintained at a temperature level at which no white smoke is discharged from the diesel engine under the present driving conditions, even if the fuel is injected in a quantity less than the prescribed injection quantity Qmin, the temperature being maintained by the combustion preceding the fuel injection cut-off.

The CPU 1 also comprises a second timer 9 which measures the elapsed time T2 of injection continuation since the restart of fuel injection. The second timer 9 measures the elapsed time T2 since the injection restart by measuring the injection continuation signal supplied to the injection controller 4. The second timer 9 may be used with the first timer 7.

The CPU 1 also comprises second inhibiting and permitting means 10. The second inhibiting and permitting means 10, as shown by steps S13–S17 in FIG. 2, continues the minimum cut-off control with control means 6 when output time T2 of the second timer 9 is less than the prescribed second set time, and cancels the minimum cut-off control when the output time is equal to the prescribed second set time or longer. The second set time is set to a time in which the temperature inside the cylinders does not rise to the temperature at which no white smoke is discharged from the diesel engine under the present driving conditions when fuel is injected in a quantity less than the prescribed injection quantity Qmin, even under the effect of combustion resulting from the restarted fuel injection.

The operation of the present embodiment having the above-described configuration will be described with reference to FIGS. 2 through 5.

The control flow diagram shown in FIG. 2 is implemented by combined operation of the above-described structural components shown in FIG. 1. Injection is conducted according to the injection chart shown in FIGS. 3 through 5 based on this control flow.

As shown in FIG. 2, with this fuel injection quantity control device, after the operation is started, in step S1, a continuation time T1 of fuel injection cut-off is acquired by a first timer 7 (see FIG. 3). In step S2, it is decided whether the injection cut-off continuation time T1 is less than the preset first set time (for example, 5–6 sec). The first set time may be automatically varied so as to extend if the water temperature or oil temperature is high and to shorten if the temperature is low.

When the injection cut continuation time T1 is less than the first set time, a transition is made to step S3, the minimum cut-off control is prohibited with first prohibiting-permitting means 8, and the usual injection control is conducted in step S4. Thus, as shown in FIG. 4, when the accelerator is pushed while the injection cut-off continuation time T1 has not reached the first set time, the temperature inside the cylinders is maintained at a level at which no white smoke is discharged from the diesel engine by combustion preceding the fuel injection cut-off. As a result, even if the required fuel injection quantity Q determined by the fuel injection determination means 5 based on the opening degree of the accelerator pedal is less than the minute injection quantity Qmin, injection is conducted by this injection quantity Q (usual injection control). Therefore, good drivability can be maintained for the driver (drive controllability), while preventing the white smoke.

Furthermore, under such usual injection control, in step S5, it is decided whether fuel injection has been made. This is because, in the state in which the accelerator pedal is released, the injection quantity can become zero even under the usual injection control. Further, as described in the previous section, if the fuel has been injected, in step S6, the first timer 7 resets the injection cut-off continuation time T1. This is because the inside of the cylinder is warmed by the combustion resulting from fuel injection. On the other hand, when the fuel injection has not been made under the usual injection control in step S5, the processing flow returns to step S1, the injection cut continuation time T1 is integrated, and the processing flow proceeds to step S2.

In step S2, when the integrated injection cut-off continuation time T1 has become the first set time or longer, the processing flow proceeds to step S7, and a minimum cut-off control is permitted by the first prohibiting-permitting means 8 (see FIG. 3 and FIG. 4). FIG. 3 illustrates the case in which the minimum cut-off control was permitted, with absolutely no injection being made until the first set time was reached, while the first timer 7 has been calculating the injection cut-off continuation time T1. FIG. 4 illustrates the case in which the minimum cut-off control was permitted, while injection was temporarily made before the first set time was reached, while the first timer 7 has been calculating the injection cut-off continuation time T1 (step S5), the injection cut-off continuation time T1 was reset when this injection was terminated (step S6), and no injection was thereafter made until the first set time was reached.

Then, in step S8, the required fuel injection quantity Q is acquired. The required fuel injection quantity Q, as described hereinabove, is determined by the injection quantity determination means 5 based on the accelerator opening degree and engine revolution speed. Further, in step S9, it is decided whether the required fuel injection quantity Q is less than the prescribed injection quantity Qmin (for example, 7–8% of the maximum injection quantity.) Furthermore, the minute injection quantity Qmin may be automatically varied so as to increase if the water temperature or oil temperature is high and to decrease if the temperature is low.

When the required fuel injection quantity Q is less than the prescribed injection quantity Qmin, in step S10, fuel injection is cut off, and the preceding fuel injection cut-off is continued. This pattern is shown in FIG. 3. A broken line 11 represents the required fuel injection quantity Q determined by the injection quantity determination means 5, and a solid line 12 represents the actual injection quantity controlled by the control means 6. The injection cut-off is thus continued because if the fuel in a quantity less than the minute injection quantity Qmin is injected, the inside of the cylinders is cooled by the preceding fuel injection cut-off and therefore the entire fuel is not properly combusted and white smoke is generated. Further, the processing flow returns to step S8 via step S11 (step S11 is described below), the processing flow circulates through steps S8–S11, and fuel injection is cut off until the required fuel injection quantity Q becomes the minute injection quantity Qmin or higher.

When in step S9, the required fuel injection quantity Q becomes the prescribed injection quantity Qmin or higher, the injection is restarted with the required fuel injection quantity Q in Step 12. If the fuel injection quantity is the minute injection quantity Qmin or higher, the combustion of the injected fuel is successively expanded, the entire fuel is appropriately combusted, and no white smoke is generated even if the inside of the cylinders was cold. Further, in step S13, an elapsed time T2 of injection continuation since the fuel injection was restarted is acquired. The elapsed time is measured in the manner as follows by the second timer 9.

Then, in step S14, it is decided whether the elapsed time T2 is less than the second set time (for example, 5–6 sec) that was set in advance. The second set time may be equal to the first set time or different therefrom, and may be automatically varied so as to extend if the water temperature or oil temperature is high and to shorten if the temperature is low.

When the elapsed time T2 is less than the second set time (see FIG. 5), the temperature inside the cylinders does not rise to the temperature at which no white smoke is discharged from the diesel engine, despite the combustion caused by the restarted fuel injection. For this reason, the processing flow proceeds to step S15 and permission of the minimum cut-off control with the control means 6 is continued. The processing flow then returns to step S8 and circulates through steps S8–S15. Thus, when the required injection quantity Q is less than the minute injection quantity Qmin, fuel is not injected, whereas when the required injection quantity Q is equal to or higher than the minute injection quantity Qmin, fuel is injected. As a result, white smoke can be prevented.

When the required injection quantity Q becomes equal to or lower than the minute injection quantity Qmin in step S9 and fuel injection is cut off in step S10, while the processing flow circulates through steps S8–S15, the second timer 9 resets the elapsed time T2 , as shown in FIG. 5. Combustion resulting from fuel injection within the period less than the elapsed time T2 cannot warm the inside of the cylinders to a degree sufficient to contribute to white smoke suppression. For this reason, the elapsed time T2 is measured from the second injection instant.

As shown in FIG. 5, in order to prevent hunting, the minute injection quantity Qmin(lo) which becomes a threshold value when the quantity of fuel in reduced is set low 1 with respect to the minute injection quantity Qmin(hi) which becomes a threshold value when the injection quantity is increased. Therefore, strictly speaking, the minute injection quantity Qmin shown in FIG. 3 is a minute injection quantity Qmin(hi).

When the elapsed time T2 is equal to or longer than the second set time in step S14, the processing flow proceeds to step 16, and the minimum cut-off control conducted by the control means 6 is cancelled (prohibited) (see FIG. 3 and FIG. 5). Thus, the minimum cut-off control that was heretofore permitted is prohibited, and in step S17, the usual injection control (control at which, even if the required injection quantity Q is less than the minute injection quantity Qmin, injection conducted at this Q) is conducted. If combustion is continuously conducted for the second set time or longer, the inside of the cylinders is sufficiently heated and no white smoke is produced even if the fuel is injected in a quantity less than the minute injection quantity Q in. Therefore, good drivability (drive controllability) can be guaranteed for the driver, while the white smoke is being prevented.

As described hereinabove, with the fuel injection quantity control device for a diesel engine in accordance with the present invention, generation of white smoke at the time of injection restart after the fuel injection cut-off is prevented without using a separate device, while reducing the degradation of drivability to a minimum.

What is claimed is:

1. A fuel injection quantity control device for a diesel engine, having injection quantity determination means for determining the required fuel injection quantity based on the accelerator opening degree and engine revolution speed, the device comprising control means for conducting a minimum cut-off control such that at the time the injection is to be restarted after fuel injection has been cut-off for the predetermined time, the fuel injection cut-off is continued when the required injection quantity determined by said injection quantity determination means is less than the prescribed minute injection quantity, and the fuel injection is restarted when the required injection quantity is equal to the prescribed minute injection quantity or larger, this restart being made with the required injection quantity attained at this time.

2. A fuel injection quantity control device for a diesel engine according to claim 1, comprising:

a first timer for measuring the continuation time of the fuel injection cut-off; and first prohibiting and permitting means for prohibiting the minimum cut-off control by said control means when the output time of said first timer is less than the prescribed first set time and permitting the minimum cut-off control by said control means when the output time of said first timer is equal to the first set time or longer.

3. A fuel injection quantity control device for a diesel engine according to claim 2, comprising:

a second timer for measuring elapsed time since the fuel injection was restarted, when permission of the minimum cut-off control by said control means is continued; and second prohibiting and permitting means for continuing permission of the minimum cut-off control by said control means when the output time of said second timer is less than the prescribed second set time and prohibiting the minimum cut-off control by said control means when the output time of said second timer is equal to the second set time or longer.

4. The fuel injection quantity control device for a diesel engine according to claim 1, wherein said prescribed minute injection quantity is set to a lower limit injection quantity at which no white smoke is discharged from the diesel engine when fuel injection is restarted inside the cylinders.

5. The fuel injection quantity control device for a diesel engine according to claim 2, wherein said minute injection quantity is set to a lower limit injection quantity at which no white smoke is discharged from the diesel engine when fuel injection is restarted inside the cylinders.

6. The fuel injection quantity control device for a diesel engine according to claim 3, wherein said minute injection quantity is set to a lower limit injection quantity at which no white smoke is discharged from the diesel engine when fuel injection is restarted inside the cylinders.

7. The fuel injection quantity control device for a diesel engine according to claim 2, wherein said first set time is set to a time such that due to combustion preceding the fuel injection cut-off, the temperature inside the cylinders is maintained at a temperature at which no white smoke is discharged from the diesel engine even if the fuel is injected in a quantity less than the prescribed minute injection quantity.

8. The fuel injection quantity control device for a diesel engine according to claim 3, wherein said first set time is set to a time such that due to combustion preceding the fuel injection cut-off, the temperature inside the cylinders is maintained at a temperature at which no white smoke is discharged from the diesel engine even if the fuel is injected in a quantity less than the prescribed minute injection quantity.

9. The fuel injection quantity control device for a diesel engine according to claim 4, wherein said first set time is set to a time such that due to combustion preceding the fuel injection cut-off, the temperature inside the cylinders is maintained at a temperature at which no white smoke is discharged from the diesel engine even if the fuel is injected in a quantity less than the prescribed minute injection quantity.

10. The fuel injection quantity control device for a diesel engine according to claim 3, wherein said second set time is set to a time such that the temperature inside the cylinders does not rise to a temperature at which no white smoke is discharged from the diesel engine when the fuel is injected in a quantity less than the prescribed minute injection quantity, even under the effect of combustion resulting from the restarted fuel injection.

11. The fuel injection quantity control device for a diesel engine according to claim 4, wherein said second set time is set to a time such that the temperature inside the cylinders does not rise to a temperature at which no white smoke is discharged from the diesel engine when the fuel is injected in a quantity less than the prescribed minute injection quantity, even under the effect of combustion resulting from the restarted fuel injection.

12. The fuel injection quantity control device for a diesel engine according to claim 5, wherein said second set time is set to a time such that the temperature inside the cylinders does not rise to a temperature at which no white smoke is discharged from the diesel engine when the fuel is injected in a quantity less than the prescribed minute injection quantity, even under the effect of combustion resulting from the restarted fuel injection.

* * * * *